No. 755,919. PATENTED MAR. 29, 1904.
G. H. NILES.
MECHANICAL MOVEMENT.
APPLICATION FILED SEPT. 4, 1903.
NO MODEL.
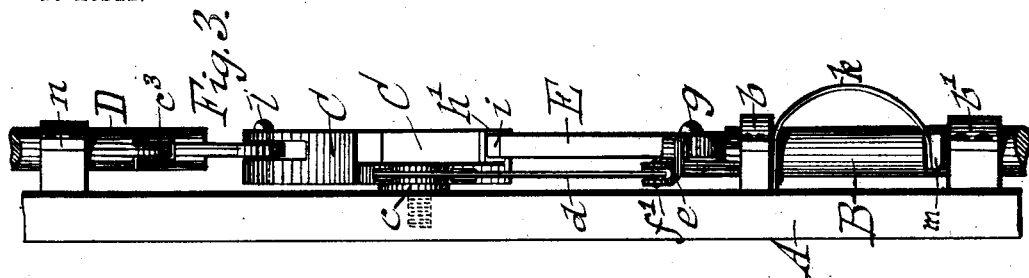
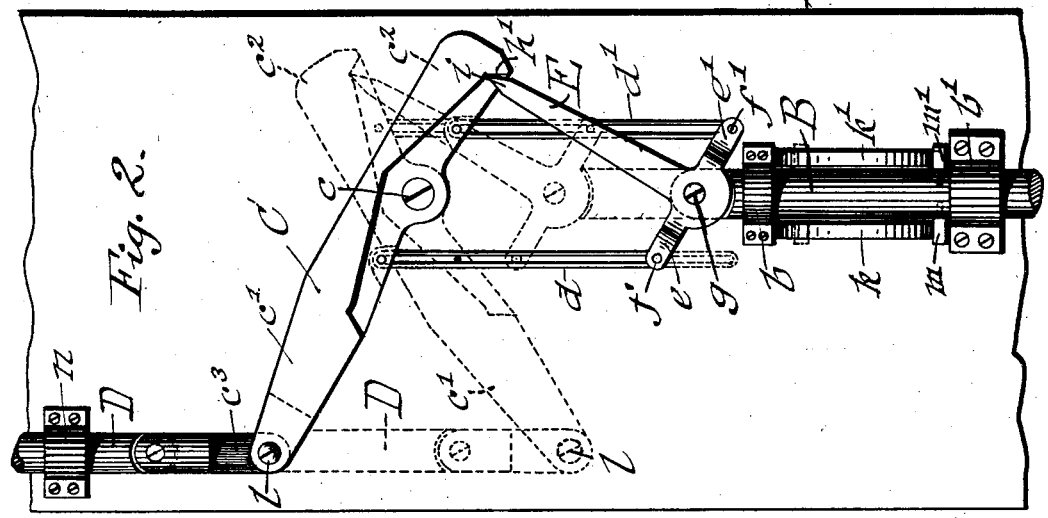
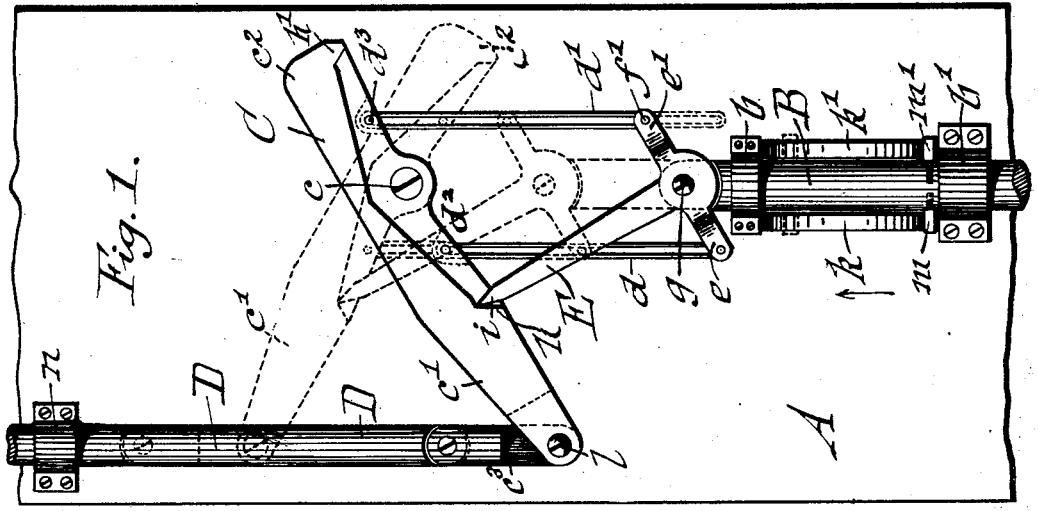
WITNESSES:
Viola A. Bromley
Cleves Mountain
INVENTOR
Glenn H. Niles No. 755,919. Patented March 29, 1904.

UNITED STATES PATENT OFFICE.

GLENN H. NILES, OF NEW YORK, N. Y.

MECHANICAL MOVEMENT.

SPECIFICATION forming part of Letters Patent No. 755,919, dated March 29, 1904.

Application filed September 4, 1903. Serial No. 171,964. (No model.)

*To all whom it may concern:*

Be it known that I, GLENN H. NILES, a citizen of the United States, residing in New York, borough of Brooklyn, in the State of New York, have invented certain new and useful Improvements in Mechanical Movements, of which the following is a specification.

The object of this invention is to furnish a simple and reliable mechanical movement by which forward-and-return motion is converted into motion in one direction on a first forward impulse or stroke, rest on the return motion, in opposite direction on the second forward impulse or stroke, and rest on the return—in other words, a mechanical movement in which a reciprocatory driving member moves the driven member only on the forward strokes or impulses and moves it alternately in opposite directions, returning to original position between each forward stroke without actuating the driven member on such returns.

The object is also to provide such a movement of this type as will permit any desired leverage to be obtained between the driving and driven members.

The invention consists of a mechanical movement comprising a driving member, a lever, a shiftable connecting-rod pivoted to said driving member and located between the same and the lever, a driven member connected with said lever, and means for shifting said connecting-rod alternately into engagement with opposite arms of said lever.

The invention consists, further, in certain other combinations of operative parts, which will be fully described hereinafter and finally pointed out in the claims.

In the accompanying drawings, Figure 1 is a plan view of a mechanism constructed according to my invention. Fig. 2 is a similar view of the same mechanism, but with the parts in a different position; and Fig. 3 is a side view of the mechanism with the parts in the same position as in Fig. 2.

Similar letters of reference indicate corresponding parts.

Referring to the drawings, A represents the base-plate or support of the movement, which may be of any suitable form or shape for supporting the parts. Upon the base is mounted in a suitable bearing or bearings $b$ $b'$ a bar B capable of reciprocation longitudinally in the same and constituting the driving member. To the base is pivoted at a suitable point, as at $c$, a lever C, having arms $c'$ $c^2$ extending in opposite directions from the fulcrum $c$. The driven member may consist of a rod D, secured to or in engagement with the lever C by any suitable means, as by a link $c^3$.

A connecting-rod E is pivoted at $g$ to the driving member B and located between said member and the lever. For controlling the movement of the connecting-rod so that upon the forward movement of the driving member the connecting-rod engages with one arm of the lever and on the return movement is shifted so as to engage on the next forward movement with the other arm of the lever two shift-arms $e$ $e'$ are employed, one at each side of the connecting-rod, and links $d$ $d'$ slidably connecting said arms each with the corresponding arm of the lever. The links are preferably made of loop form—as, for example, from suitable wire—and are slidably connected or pivoted at one end to the arms of the lever C by any suitable means—for example, pins $d^2$ $d^3$, located in sockets of said arms. The connection with the shift-arms $e$ $e'$ of the connecting-rod may be made by means of pins $f$ $f'$, located in the forked ends of said arms. To secure uniformity of forward and return movement, each link is connected with its shift-arm at a point equidistant from the pivot of the connecting-rod with the corresponding connection-point of the opposite link. In like manner connection of the links, respectively, at opposite sides of the pivot of the lever C with the arms of the same is made at points equidistant from said pivot. In order to limit the movement of the connecting-rod at each end of its shifting movement, stops $h$ $h'$ are employed, which are formed by the end walls of a suitable recess in the connecting-rod, or any other suitable means for limiting the movement of the rod so that the same does not pass out of position for engaging the lever may be used.

Such being the general features of the construction, the operation is as follows: The parts being in the position indicated in full lines in Fig. 1, the driving member is given forward movement, as indicated by the arrow in Fig. 1. This causes forward movement of the connecting-rod E. As the outer or bearing end $i$ of the same is at one side of a line between the pivots $c$ $g$ and in position to engage one arm of the lever C, in this case the arm $c'$, and is retained in such position by stop $h$, this forward movement of the driving member and the connecting-rod causes movement of the lever C and parts connected therewith, so that motion in forward direction is thus imparted to the driven member D. Forward motion of the driving member being discontinued, the parts come to rest in the position indicated by dotted lines in Fig. 1. During the forward motion of the arm $c'$ the opposite arm $c^2$ swings in backward direction and carries with it the link $d'$, which slides on the pin $f'$. Return motion is now imparted to the driving member. This may be accomplished manually or by any suitable power mechanism or by a spring—for example, the springs $k$ $k'$, one at each side of the driving member and secured at one end to the bearing $b$ of the base and at the other end to studs $m$ $m'$ of the driving member, said springs having been placed under tension on the forward movement. Upon the return movement now taking place, were the friction of the other parts moved sufficiently to overcome the retardance to rearward movement offered by the driven member and lever said driven member and lever would also be returned and all the parts would again assume the first position. It is necessary that the lever C shall be under sufficient retardance to return movement to overcome the friction due to shifting the connecting-rod into opposite position. This retardance will ordinarily be afforded by the work being done by the driven member or the mechanism to which that member is attached. Separate means may, however, be provided—as, for instance, a bearing $n$ upon the base A creating sufficient friction for the purpose. The lever C being therefore stationary, rearward motion of the pivot $g$ causes the connecting-rod E to swing into the position indicated in full lines in Fig. 2, the pin $f'$ moving rearwardly in the link $d'$. Forward movement is now imparted again to the driving member. This causes forward movement of the connecting-rod, and as the same is now in engagement with the opposite lever-arm $c^2$ the lever C is turned in opposite direction to its first movement and causes a positive return of the driven member. The arm $c'$ by this movement approaching the shift-arm $e$, link $d$ slides relatively thereto upon the pin $f$. The parts come to rest in the position indicated in dotted lines in Fig. 2. Return movement of the driving member now takes place. As in the first return movement, it also is here necessary that there be greater retardance of the lever C than the resistance offered by the friction produced in shifting the connecting-rod. The bearing $n$ affords this, as before, and upon the rearward movement the parts move into the first position. (Shown in full lines in Fig. 1.) The operations may then be successively repeated.

It is obvious that the driven member may be connected with the lever C at any point in the length of the latter, the leverage obtained between the driving and driven members being dependent on the location of the point of connection. In the mechanism illustrated the point of connection $l$ is beyond the stop $h$, and the driven member has therefore a longer movement than the driving member. It is also obvious that the proportions of the various parts may be varied from those shown without departing from the spirit of the invention.

Having thus described my invention, I claim as new and desire to secure by Letters Patent—

1. A mechanical movement, consisting of a driving member, a lever, a shiftable connecting-rod pivoted to said driving member and located between the same and the lever, a driven member connected with said lever, and means for shifting said connecting-rod alternately into engagement with opposite arms of said lever, substantially as set forth.

2. A mechanical movement, consisting of a driving member, a lever, a laterally-shiftable connecting-rod pivoted to said driving member and located between the same and the lever, a driven member connected with said lever, and means controlled by said lever for shifting said connecting-rod alternately into engagement with opposite arms of said lever, substantially as set forth.

3. A mechanical movement, consisting of a driving member, a lever, a laterally-shiftable connecting-rod pivoted to said driving member and located between the same and the lever, a driven member connected with the lever, shift-arms connected with said connecting-rod, and means operatively connecting the arms of said lever with said shift-arms, substantially as set forth.

4. A mechanical movement, consisting of a driving member, a lever, a laterally-shiftable connecting-rod pivoted to said driving member and located between the same and the lever, a driven member connected with the lever, shift-arms connected with said connecting-rod and extending at opposite sides of the same, and links slidably connecting the arms of said lever each with the corresponding shift-arm, substantially as set forth.

5. A mechanical movement, consisting of a driving member, a lever, a laterally-shiftable connecting-rod pivoted to said driving member and located between the same and the lever, a driven member connected with the lever, shift-arms connected with said connecting-rod and extending at opposite sides of the same, and links pivoted to the arms of said lever and slidably connected each with the corresponding shift-arm, substantially as set forth.

6. A mechanical movement, consisting of a driving member, a lever, a laterally-shiftable connecting-rod pivoted to said driving member and located between the same and the lever, a driven member connected with the lever, shift-arms connected with said connecting-rod and extending at opposite sides of the same, and links slidably connecting said shift-arms each with the corresponding lever-arm at points equidistant from the pivot of the connecting-rod and the pivot of the lever respectively, substantially as set forth.

7. A mechanical movement, consisting of a driving member, a lever, a shiftable connecting-rod pivoted to said driving member and located between the same and the lever, a driven member connected with the lever, means for shifting said connecting-rod alternately into engagement with opposite arms of said lever, and means for limiting the shifting movement of said connecting-rod, substantially as set forth.

8. A mechanical movement, consisting of a driving member, a lever, a laterally-shiftable connecting-rod pivoted to said driving member and located between the same and the lever, a driven member connected with the lever, means controlled by said lever for shifting said connecting-rod alternately into engagement with opposite arms of said lever, and stops projecting from said lever into the path of said connecting-rod, substantially as set forth.

9. A mechanical movement, consisting of a driving member, a lever, a shiftable connecting-rod pivoted to said driving member and located between the same and the lever, means for shifting said connecting-rod, a driven member connected with the lever, and means retarding said lever in excess of the operative resistance of said shifting means, substantially as set forth.

10. A mechanical movement, consisting of a driving member, a lever, a laterally-shiftable connecting-rod pivoted to said driving member and located between the same and the lever, means controlled by the lever for shifting said connecting-rod, a driven member connected with the lever, means retarding said lever in excess of the operative resistance of said shifting means, and means also in excess of said operative resistance connected with the driving member for returning the same and operating thereby said shifting means, substantially as set forth.

In testimony whereof I have signed my name to this specification in the presence of two subscribing witnesses.

GLENN H. NILES.

Witnesses:
JOHN A. DAVISON,
VIOLA A. BROMLEY.